(12) United States Patent
Hubrich

(10) Patent No.: US 7,812,597 B2
(45) Date of Patent: Oct. 12, 2010

(54) INDUCTIVE MAGNETIC POSITION SENSOR

(75) Inventor: Stefan Hubrich, Filderstadt (DE)

(73) Assignee: Sick AG, Waldkirch (DE)

( * ) Notice: Subject to any disclaimer, the term of this patent is extended or adjusted under 35 U.S.C. 154(b) by 402 days.

(21) Appl. No.: 12/005,873

(22) Filed: Dec. 28, 2007

(65) Prior Publication Data

US 2008/0157757 A1 Jul. 3, 2008

(30) Foreign Application Priority Data

Dec. 28, 2006 (DE) .................. 10 2006 061 771

(51) Int. Cl.
*G01B 7/14* (2006.01)
*H01F 5/00* (2006.01)

(52) U.S. Cl. ............................. 324/207.24; 324/207.15

(58) Field of Classification Search ............ 324/207.11, 324/207.13, 207.15, 207.16, 207.17, 207.24
See application file for complete search history.

(56) References Cited

U.S. PATENT DOCUMENTS

| | | | |
|---|---|---|---|
| 4,282,485 A | | 8/1981 | Pauwels et al. |
| 6,118,271 A | * | 9/2000 | Ely et al. ............... 324/207.17 |
| 2004/0036468 A1 | * | 2/2004 | Hoffelder et al. ...... 324/207.17 |

FOREIGN PATENT DOCUMENTS

| | | | |
|---|---|---|---|
| DE | 3801779 A1 | | 7/1989 |
| DE | 100 44 839 A1 | | 4/2001 |
| DE | 100 25 661 A1 | | 12/2001 |
| DE | 102 55 710 A1 | | 6/2004 |
| DE | 103 42 473 A1 | | 5/2005 |
| EP | 0936443 | * | 11/1998 |
| WO | WO 97/14935 A2 | | 4/1997 |

\* cited by examiner

*Primary Examiner*—Kenneth J Whittington
(74) *Attorney, Agent, or Firm*—Townsend and Townsend and Crew, LLP

(57) ABSTRACT

A motion sensor which has a coil that surrounds a ferromagnetic core and at least one magnet that is longitudinally movable along the coil. The magnet causes a magnetic saturation of the ferromagnetic core in an associated zone that covers a portion of the length of the coil. An evaluation unit generates a position signal in dependence on the position of the movable magnet along the longitudinal extent of the coil. The coil has at least two superimposed winding layers that surround the ferromagnetic core and are wound in opposite directions. The windings of adjacent segments generally have about the same width over which the winding density remains constant. Thus, the winding density of the segments of one of the winding layers increases linearly over the length of the sensor while the winding density of the segments in the other winding layer linearly decreases over the sensor length.

3 Claims, 1 Drawing Sheet

INDUCTIVE MAGNETIC POSITION SENSOR

CROSS-REFERENCES TO RELATED APPLICATIONS

This application claims the priority of German Application No. 10 2006 061 771.1, filed Dec. 28, 2006, the disclosure of which is incorporated herein by reference.

BACKGROUND OF THE INVENTION

The present invention concerns magnetic motion sensors which generate output signals that have linear characteristics and which include a coil that surrounds a ferromagnetic core and at least one permanent magnet that can be moved in the longitudinal direction of the coil and which causes a magnetic saturation along a zone that is parallel to the ferromagnetic core.

Motion sensors are used, for example, for monitoring the piston travel in hydraulic or automatic systems. Sensors which function according to the magnetostrictive principle are known, but they have their disadvantages. They require extensive electronics to process the output, which renders the devices costly and not suitable for many lower cost applications. Such sensors further have mechanically complex sensing elements which are subject to mechanical stresses caused, for example, by vibrations and/or shock loads. Magnetostrictive sensors additionally consume relatively large amounts of electric current which makes it unfeasible to power such systems with batteries. Magnetostrictive sensors have an additional disadvantage, particularly when used to measure short measuring distances, because only a relatively small portion of the sensor can actually be used as an electric measurement length.

Further, magneto-inductive sensors are known. They employ a primary winding to generate a magnetic field and a secondary winding for a position-dependent field detection. These sensors have the disadvantage that a multitude of windings must be separately connected and operated, which can only be obtained at relatively high costs.

German patent publication DE 103 42 473 A1 describes a position sensor that has a ferromagnetic core surrounded by a coil with a winding density that varies in the longitudinal direction. It employs a movable magnet with which different sections of the core can be magnetically saturated so that the coil has a position-dependent characteristic. A disadvantage of this sensor is that, for many applications, the position signals must have linear characteristics. DE 103 42 473 A1 teaches that the winding density should result in a linear change in inductivity when the magnet is moved or repositioned by linearly increasing or decreasing the winding density over the measurement length. This significantly limits the largest possible measurement length. For example, when the winding density decreases linearly, areas or zones without an effective inductivity layer are present even when the measurement length is short. The measurement length might be increased (for example, to 400 mm) by arranging segments having constant winding densities next to each other instead of providing a continuous increase or decrease in the winding density. In this arrangement, the winding densities of the different segments would increase or decrease linearly. By maintaining the width of the segments small relative to the width of the magnet, for example 113, the significantly greater width of the saturation zone causes a smoothing of the stepped inductivity layer so that the overall characteristics of the output are smoothed to obtain a substantially linear characteristic. Such a construction increases the available measurement length, but has the disadvantage of an undesirable offset caused by the fact that the maximum inductivity reduction attained by saturation is small relative to the overall inductivity. Such an offset is undesirable and very costly to electrically compensate.

A further disadvantage of the sensor is that the measurement size, which is position-dependent, is the characteristic of the coil. However, many applications prefer that the position-dependent signal is a direct current or direct voltage value. As a result, the measured value must first be electronically converted into a direct current or direct voltage signal, which is costly.

BRIEF SUMMARY OF THE INVENTION

It is an object of the present invention to provide a motion sensor that generates an output signal which is linearly dependent on the position of a magnet which can be inexpensively produced. The sensor should be small in size, mechanically robust and provide a large measurement area while using electronics which are simple and contain only few component parts.

The motion sensor of the present invention has a coil that surrounds a ferromagnetic core. It further has at least one magnet that is longitudinally movable along the coil. The magnet causes a magnetic saturation of the ferromagnetic core in an associated zone.

The coil further has an evaluation unit for generating a position signal in dependence on the position of the movable magnet along the longitudinal extent of the coil. The coil of the present invention has at least two superimposed winding layers that surround the ferromagnetic core and are wound in opposite directions. The windings of adjacent segments generally have about the same width over which the winding density remains constant. Thus, the winding density of the segments of one of the winding layers increases linearly over the length of the sensor while the winding density of the segments in the other winding layer linearly decreases over the sensor length.

The sensor of the present invention has a ferromagnetic core that is surrounded by at least two electrical winding layers. The inner winding layer, which has adjacent segments of about equal width but with different winding densities, has a superimposed outer winding layer which is constructed so that the combined winding densities of both layers is constant over the length of each segment and the two winding layers surround the ferromagnetic core in opposite winding directions. The winding layers are constructed so that the winding densities within each segment remain constant. The winding densities of the segments in one layer increase linearly over the length of the sensor while the winding densities of the segments in the other layer decrease linearly.

In accordance with the present invention, both winding layers are electrically connected in series. When electric current flows through the winding layers in the absence of a magnet, the magnetic fields generated by the layers substantially offset each other in the ferromagnetic core.

When a magnet acts on a section of the ferromagnetic material so that the section becomes magnetically saturated, the portions of the magnetic fields generated by the winding layers change differently when the winding densities in the two layers over this section of magnetic saturation are different.

Since the winding layers surround the ferromagnetic core in opposite directions, the voltages in the winding layers are phase-shifted by 180°. As a result, an electric potential is generated at the connection point of the series-coupled winding layers which is dependent on or a function of the position of the magnet.

The motion sensor of the present invention therefore has the advantage that an alternating current signal with a position-dependent amplitude is available as a direct output of the sensor. This makes it simple to process the AC signal into a position-dependent DC voltage or DC current signal as is often desired for industrial applications of the sensor. In addition, the signal generated by the sensor of the present invention has a large signal magnitude and only a small offset signal. This is advantageous because further electronic compensations can be realized without additional cost or can be dropped altogether. It is of course particularly useful and advantageous that the magnetic motion sensor of the present invention generates an output signal with a linear characteristic.

In a further development of the invention, the sensor can be constructed so that the sum of the windings of all winding layers is approximately equal for each segment width, which increases the linearity of the output.

It is preferred that the width of the segments is at least one-fourth of the spatial extent of the magnet in a direction parallel to the measurement direction. The winding layers are electrically coupled in series, and the amplitude of the voltage signal at the connection point for both winding layers is used to generate the position signal.

DETAILED DESCRIPTION OF THE PREFERRED EMBODIMENTS

Figure 1:
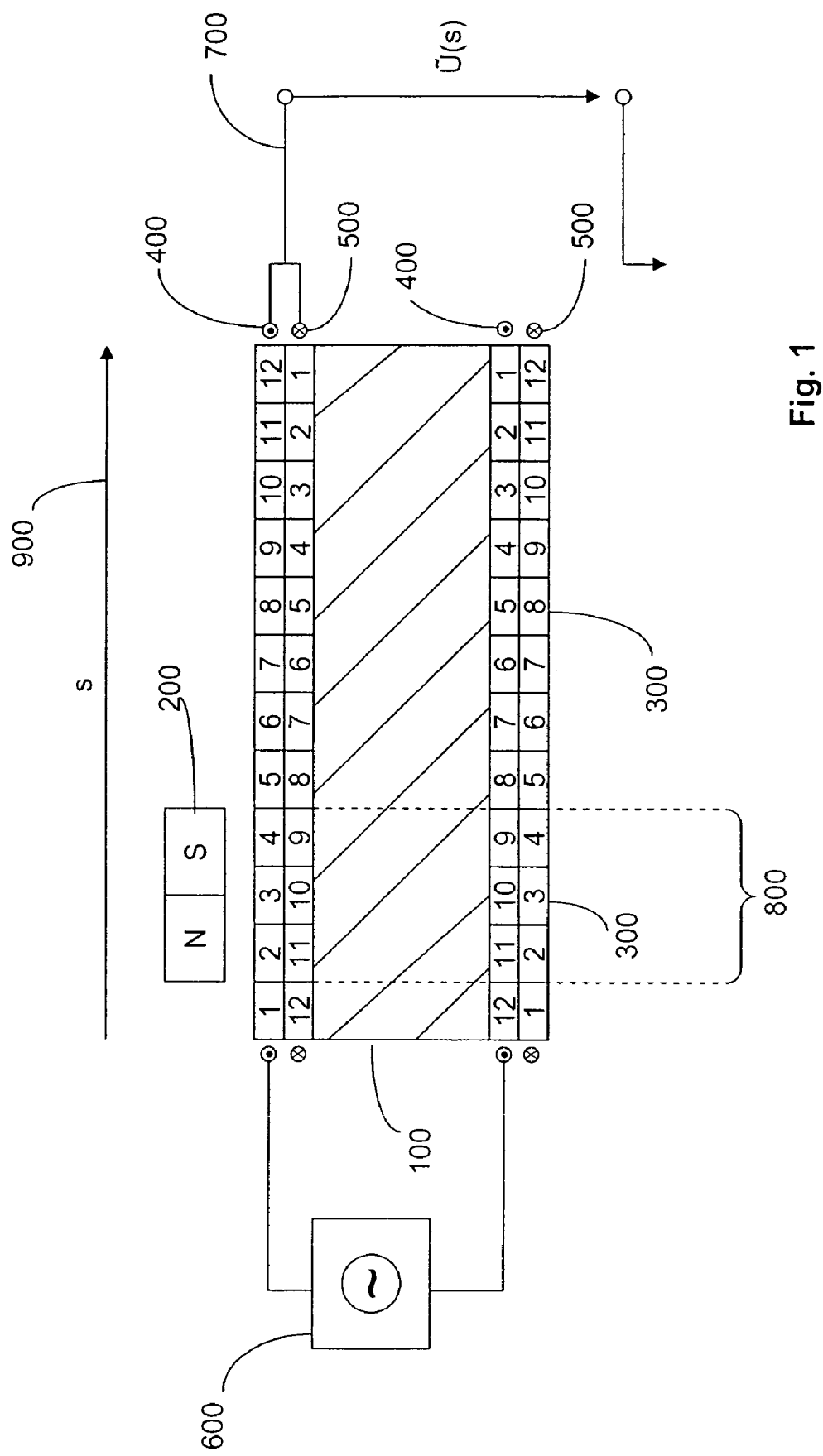
FIG. 1 shows an embodiment of a sensor constructed in accordance with the invention.

First and second winding layers 400, 500 surround a ferromagnetic core 100. The winding layers are divided into segments 300 of equal widths. The winding density within any given segment 300 is constant, and the winding density changes linearly from segment to segment over the path length 900. In the inner winding width 500, the respective winding densities decrease over the path length 900 as shown in the drawing by segments 12:11:10 ... :1.

In the outer winding layer 400, the respective winding densities increase over the path length 900 as shown in the drawing by segments 1:2:3:4 ... :12.

The length of segment 300 preferably is approximately one-third of the longitudinal dimension of magnet 200 that serves as a position indicator.

The outer winding 400 is wound about ferromagnetic core 100 in the opposite direction to the windings of inner winding layer 500.

At one end of the sensor, the two windings 400, 500 are electrically connected in series. Both serially connected winding layers 400, 500 are fed by an alternating current source 600.

The motion sensor illustrated in FIG. 1 functions as follows:

The series-connected winding layers 400, 500 are subjected to an alternating current from source 600 and an alternating current flows through the windings. As a result, each winding layer 400, 500 generates an alternating magnetic flux in ferromagnetic core 100. Due to the opposite winding directions of winding layers 400, 500, their proportions of the magnetic flux are primarily effective in opposite directions and their respective magnetic effects are in part compensated. Without influence from a magnetic field, a voltage appears at connecting point 700 of the winding layers 400, 500 which is the result of the non-compensated magnetic flux proportions and the ohmic resistance of the two winding layers 400, 500. In the vicinity of the ferromagnetic core 100 which, as was discussed above, is surrounded by the two winding layers 400, 500, magnet 200 generates a sufficiently pronounced magnetic field strength to generate a magnetic saturation zone 800 in ferromagnetic core 100 that moves with magnet 200 parallel to the movement direction 900.

In the saturation zone 800, the magnetic permeability of core 100 is changed to a value of close to one. As a result, in the saturation zone 800, core 100 has the magnetic effect of air. Since the winding densities of winding layers 400, 500 in saturation zone 800 differ, the amplitudes of their respective magnetic flux portions are reduced by different amounts. The winding layer 400, 500, which has fewer windings in saturation zone 800 and therefore more windings in zones without magnetic saturation, generates a magnetic flux with a larger amplitude than the winding layer which has a larger number of windings in saturation zone 800.

Thus, the balance of the vectorially oppositely directed properties of the magnetic flux is thereby eliminated. The resulting magnetic flux generates in both winding layers 400, 500 vectorially opposite inductive voltages. This changes the amplitude of the AC voltage at connection point 700. The magnitude of the change depends on the different winding densities in the two winding layers 400, 500 at the saturation zone 800 and is therefore dependent on or is a function of the position of magnet 200 along the movement direction or motion path 900.

It should be noted that an embodiment of the sensor with only one winding layer 400, 500 would also entail a position-dependent change in the magnetic flux. However, the voltage increase attainable therewith would only be half as large as the voltage increase attainable with two winding layers 400, 500.

The segment width 300 of the two winding layers 400, 500 is approximately one-third of the length of magnet 200. This enables the use of sufficiently high winding densities needed for a long measurement length 900 for generating useful changes of the magnetic flux in the segment having the smallest winding density. This results in only small and therefore acceptable errors in the linearity of the output voltage at connection point 700 for measurements over the entire distance 900. It is obtained by forming the inductivity layer of the two winding layers 400, 500 in steps and not linearly. This error is minimized by the fact that the magnetic field generated by magnet 200 always extends over at least three segments 300, which smoothes the output signal characteristic.

What is claimed is:

1. A magnetic motion sensor comprising:
a coil having a length, surrounding a ferromagnetic core and including at least first and second superimposed winding layers which are wound about the ferromagnetic core in opposite directions and define adjacent segments over the length of the coil which have substantially like widths and constant winding densities,
the winding densities of the segments of the first winding layer increasing linearly over a length of the sensor,
the winding densities of the segments of the second winding layer decreasing linearly over the length of the sensor, a sum of the windings of all winding layers over the width of each segment being approximately the same, a magnet that is movable relative to the coil in a longitudinal direction of the coil and causes a magnetic saturation of the ferromagnetic core in an associated zone, and an evaluation unit operatively coupled with the coil and adapted to generate a position signal in dependence on a position of the movable magnet along the coil.

2. A motion sensor according to claim 1 wherein the width of the segments is at least one-fourth of a spatial extent of the magnet in a direction parallel to the measurement direction.

3. A motion sensor according to claim 1 wherein the winding layers are electrically connected in series, and wherein an amplitude of a voltage signal at a connection point between the winding layers is used for generating the position signal.

* * * * *